United States Patent [19]
Esparsa et al.

[11] Patent Number: 5,479,835
[45] Date of Patent: Jan. 2, 1996

[54] REVERSE GEAR SYNCHRONIZER

[75] Inventors: Rodolfo Esparsa; William Leonard, both of Queretaro, Mexico

[73] Assignee: Transmisiones y Equipos Mecanicos, S.A. de C.V., Queretaro, Mexico

[21] Appl. No.: 288,250

[22] Filed: Aug. 9, 1994

[51] Int. Cl.$^6$ ............................. F16H 3/091; F16D 23/08
[52] U.S. Cl. ................................ 74/331; 74/339; 74/360
[58] Field of Search ............................ 74/325, 331, 339, 74/360

[56] References Cited

U.S. PATENT DOCUMENTS

| | | | |
|---|---|---|---|
| 4,667,526 | 5/1987 | Young | 74/331 |
| 5,090,263 | 2/1992 | Weyman et al. | 74/339 |

FOREIGN PATENT DOCUMENTS

| | | | |
|---|---|---|---|
| 2800267 | 7/1979 | Germany | 74/360 |
| 586456 | 10/1958 | Italy | 74/339 |
| 62-093541 | 4/1987 | Japan | 74/331 |

*Primary Examiner*—Charles A. Marmor
*Assistant Examiner*—Nathan O. Jensen
*Attorney, Agent, or Firm*—Spencer, Frank & Schneider

[57] ABSTRACT

A manual transmission for a motor vehicle includes an input shaft; a counter shaft constantly torque-transmittingly coupled to the input shaft and carrying driven gears; a main shaft carrying forward driven gears mounted for free rotation and being in a constant meshing relationship with respective driven gears; and a reverse shaft on which a reverse idler gear and a reverse driven gear are axially fixed. The reverse idler gear and the reverse driven gear are in continuous driving connection with the counter shaft and the main shaft, respectively. A reverse gear selector includes a sleeve axially slidably mounted on the reverse shaft between the reverse idler gear and the reverse driven gear. A locking mechanism is provided on the sleeve, the reverse idler gear and the reverse driven gear for torque-transmittingly coupling the reverse idler gear to the reverse driven gear or for disengaging the reverse idler gear from the reverse driven gear dependent on the position of the sleeve. A synchronizer is mounted on the reverse shaft for synchronizing rotational speeds of the reverse idler gear and the reverse driven gear prior to allowing the sleeve to assume the engaging first position.

6 Claims, 3 Drawing Sheets

REVERSE GEAR SYNCHRONIZER

BACKGROUND OF THE INVENTION

The present invention relates to a reverse gear synchronizer in a motor vehicle manual transmission.

The typical motor vehicle manual transmission has an input shaft, a splined main shaft (output shaft) and a counter shaft. The input shaft, which is connected to the engine of the vehicle via a clutch, has a gear attached to one end for driving a corresponding gear located on the counter shaft. The input shaft gear and the corresponding counter shaft gear are in constant engagement so that as the input shaft rotates, the input shaft gear likewise rotates thus rotating both the corresponding gear on the counter shaft.

Usually, the counter shaft is provided with several fixed driver gears which rotate at a speed constant with the counter shaft. Each fixed driver gear is in constant engagement with a corresponding driven gear located on the main shaft so that as each fixed driver gear rotates with the counter shaft, each corresponding driven gear is rotated in the opposite direction. Each engaged driver gear and corresponding driven gear define a forward gear ratio, usually referred to as first gear, second gear, third gear, forth gear, and so on. Each gear ratio is used to increase the torque transmitted from the engine to the wheels by varying degrees.

Typically, one shift collar is located between adjacent driven gears and is splined for fixed rotation relative to the main shaft. Further, each shift collar is axially slidable along the main shaft for engagement with a corresponding adjacent driven gear. Each driven gear is free to rotate independently of the main shaft until locked into position by a shift collar, as will be explained further.

Each driven gear is typically provided with large teeth known as "dogs", located on a side of the gear for engagement with similar dogs located on the adjacent shift collar. The engagement between the shift collar, which is rotating with the main shaft, and the selected driven gear locks the gear to the shaft so that power from the engine is transmitted through the selected driven gear and the main shaft to the wheels of the vehicle.

The driver of the motor vehicle shifts into a desired gear ratio using a shift lever and attached shift forks which engage with one or more of the shift collars. Depending upon the gear ratio selected, the shift lever moves a shift fork or forks and a corresponding engaged shift collar or collars axially along the main shaft, until the collar or collars engage an adjacent driven gear, locking the driven gear to the main shaft.

To achieve a smooth engagement between the dogs of the collar and the gear, synchronizing systems have been developed which allow the two sets of dogs to reach the same speed before they are engaged. Once their speeds are synchronized, the two sets of dogs can mesh smoothly.

The typical vehicle transmission is also provided with a reverse gear system so that the vehicle may be moved in a reverse direction. The reverse gear system usually comprises a fixed reverse driver gear located on the counter shaft, and a corresponding driven gear located on the main shaft. In order to reverse the direction of rotation of the main shaft relative to the forward gear direction, a reverse idler gear must be provided between the reverse driver gear and the reverse driven gear. When all three gears of the reverse gear system are in engagement, the reverse driver gear rotates the idler gear, which in turn rotates the reverse driven gear.

Various methods of engaging the reverse gears together have been developed as are disclosed, for example, in U.S. Pat. No. 3,245,278; U.S. Pat. No. 3,478,615; U.S. Pat. No. 3,745,847; U.S. Pat. No. 2,753,728; U.S. Pat. No. 4,856,361; U.S. Pat. No. 4,370,896; U.S. Pat. No. 4,257,284; U.S. Pat. No. 4,531,418; and U.S. Pat. No. 4,263,815. For example, it is known to spline or key all three reverse gears (i.e., the reverse driven gear, the reverse driver gear and the idler gear) to their respective shafts, so that as an individual reverse gear rotates, the corresponding shaft likewise rotates. In order to shift into reverse gear using this configuration, at least one of the three reverse gears is typically slidable along its respective splined shaft to engage the other reverse gears. In this manner, the teeth of one reverse gear, for example the idler gear, slide into engagement with the teeth of the reverse driver gear and the teeth of the reverse driven gear, allowing the transfer of power from the engine to the wheels of the vehicle.

A sliding reverse gear system has numerous associated problems. First, the reverse gears must be straight spur gears. A straight spur gear has straight teeth cut parallel to its axis of rotation and is needed for the teeth of two gears to slidingly engage with each other. However, straight spur gears tend to be noisy in operation. A possible solution for reducing gear noise is to use helical type gears which have curved teeth cut at an angle to the axis of rotation, and allows for at least two teeth on each gear to be in constant meshing engagement. This kind of meshing action provides for smoother, quieter movement, and is used for the forward gears. However, each helical gear must be in constant meshing engagement with its corresponding helical gear, because helical gears cannot be axially slid into engagement with each other.

Second, during the sliding process of a straight gear, it is possible that the two straight gears do not fully engage. This condition would place added stresses on the portions of the teeth that are engaged, resulting in possible tooth breakage. Further, partially engaged gears are subject to torsional forces, contributing to gear jump out.

Third, the sliding gear must slide at least a distance equal to its width to either fully engage or fully disengage the corresponding gear. This requires more room in the transmission housing than a gear and collar system. Further, the sliding gear is moved via the shift lever, which is moved by the driver. Because the shift lever must move the sliding gear a greater distance, the shift lever must also move a corresponding greater distance. This extra movement of the shift lever thus requires extra space within the interior of the vehicle.

It is also known to divide the reverse idler gear into a double idler gear, as is disclosed in U.S. Pat. No. 4,836,041. In this system, the reverse idler gear comprises two separate axially aligned gears. One of the gears is in constant meshing engagement with a corresponding driven gear and the other gear is in constant meshing engagement with a coupling sleeve which, in turn, constantly meshes with the main shaft. When not engaged together, the two idler gears are free to rotate independently of one another. To engage the two gears together, one of the two gears is axially slid towards the other gear. Eventually, the two gears come into contact, locking the gears together. A smooth engagement between the two idler gears is ensured by a synchronizer arranged therebetween. However, this system has all of the aforementioned disadvantages of a sliding gear. Furthermore, an additional drive gear has to be cut on the countershaft. Also, both gears require a complex configuration.

Another known system uses a double idler gear system as described above, but the two adjacent reverse idler gears are axially fixed along the shaft. Each gear is provided with at least one dog on adjacent sides. A sleeve is provided that is axially slidable along the shaft to engage the dogs of the two gears together, so that the two gears rotate as a single gear. This system has the advantage of being able to use helical gears; it lacks, however, a synchronizing system.

In order to shift into the reverse gear using a nonsynchronized reverse gear configuration, all of the reverse gears would typically need to be at a complete stop so that the teeth of the gears could slide into engagement. Stated alternately, the wheels of the vehicle would need to be motionless so that the main shaft and the connected driven reverse gear do not rotate. However, even when the vehicle is motionless, the counter shaft and the attached fixed gears may rotate due to inertia. Thus, unless the reverse gears are fully synchronized, the teeth or dogs of the reverse gears may grind before meshing.

In the reverse synchronizer disclosed in U.S. Pat. No. 4,856,361 a fixed gear on the countershaft drives an idler gear which, in turn, drives the reverse gear located on the main shaft. The reverse gear is provided with "dogs" and is free to rotate independently of the main shaft until it is engaged by the collar of the reverse synchronizer.

In still another prior art construction the reverse gear is affixed to the main shaft, the reverse idler gear rotates freely and the synchronizer is located on the countershaft.

It is a disadvantage of both last-named systems that they require excessive axial space.

SUMMARY OF THE INVENTION

It is an object of the present invention to provide a manual transmission with a synchronized reverse gear system which is located on a reverse gear shaft and which may use a reverse spur gear and a helical reverse idler on the reverse gear shaft.

It is yet another object of the present invention to reduce the overall number of gears utilized with a manual transmission, thus reducing the weight and size of the transmission.

The above and other objects are accomplished according to the invention by the provision of a manual transmission with an axially rotatable counter shaft. Driver gears are concentrically located on, and rotatably and axially fixed, relative to the counter shaft. An axially rotatable main shaft having concentrically located forward driven gears is provided. Each driven gear is in constant meshing engagement with a respective driver gear. At least one driven gear is freely rotatable relative to the main shaft. The manual transmission also comprises a first synchronizer element that is adjacent to the freely rotatable driven gear. The first synchronizer element is rotatably fixed relative to the main shaft and is for rotatably fixing the freely rotatable driven shaft and is for rotatably fixing the freely rotatable driven gear relative to the main shaft. A reverse shaft is also provided. Concentrically located on the reverse shaft is a reverse idler gear that is in constant meshing engagement with one driver gear. Adjacent to the reverse idler gear and likewise concentrically located on the reverse is a reverse driven gear. The reverse driven gear is in constant meshing engagement with the first synchronizer element and is free to axially rotate independent of the reverse idler gear. Locking means for lockingly engaging the reverse idler gear to the reverse driven gear are provided so that the reverse idler gear and the reverse driven gear rotate as a single gear. Further, synchronization means for allowing the rotational speeds of the reverse driven gear and the reverse idler gear to become synchronized before the locking means lockingly engages the reverse idler gear and the reverse driven gear together are provided.

DETAILED DESCRIPTION OF THE PREFERRED EMBODIMENT

Figure 1:
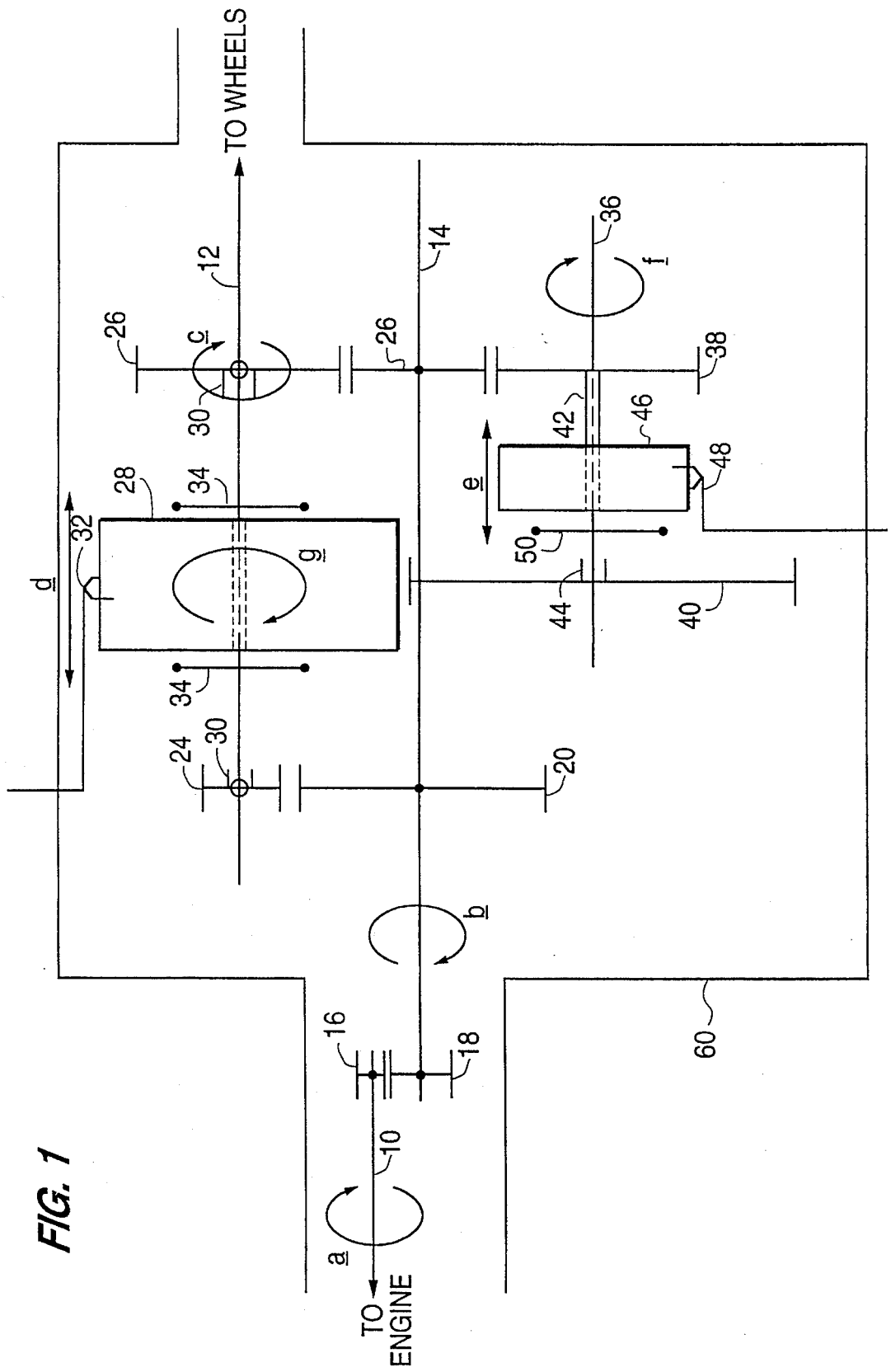
FIG. 1 is a schematic illustration of a manual transmission having the reverse gear synchronizer according to a preferred embodiment of the invention.

Referring to FIG. 1, the manual transmission shown therein has an input shaft 10, a main shaft (output shaft) 12 and a counter shaft 14. The input shaft 10, which is connected to an engine of the vehicle via a clutch (not illustrated, has a driver gear 16 attached to one end for driving a corresponding driven gear 18 keyed to the counter shaft. Thus, input shaft 10 and counter shaft 14 rotate in opposite directions a and b, respectively.

To counter shaft 14 there are keyed driver gears 20, 22 which are in constant meshing engagement with a corresponding driven gear 24, 26 located on the main shaft 12 so that as each fixed driver gear rotates in direction b with the counter shaft, each corresponding driven gear is rotated in the opposite direction c. Each driver gear 20, 22 and corresponding driven gear 24, 26 define a forward gear ratio, usually referred to as first gear, second gear, third gear, fourth gear, and so on.

Typically, between adjacent driven gears a shift collar is disposed. Thus, between gears 24 and 26 a shift collar 28 is located and is splined to main shaft 12 for fixed rotation therewith. Shift collar 28 is axially slidable in direction d along the main shaft into engagement with either gear 24 of 26. Each driven gear is free to rotate independently of main shaft 12 until locked into position by shift collar 28, as will be explained further.

Each driven gear 24, 26 is provided with large teeth known as "dogs" 30, located on a side of the gear for engagement with similar dogs located on the adjacent shift collar 28. The engagement between shift collar 28, which is rotating with the main shaft, and the selected driven gear locks the driven gear to the main shaft so that power from the engine is transmitted through the selected driven gear and the main shaft to the wheels of the vehicle.

The driver of the motor vehicle shifts into a gear to transmit torque and power using a shift lever (not shown) and a shift fork 32, which engages with shift collar 28. Depending upon the gear selected, the shift lever moves shift fork 32 and a corresponding engaged shift collar 28 axially along the main shaft 12 in direction d, until the shift collar engages an adjacent driven gear, locking the driven gear to the main shaft in the aforementioned manner.

Synchronization means 34, such as a synchromesh or blocker ring system as well know in the art, are provided on main shaft 12 to allow the dogs of shift collar 28 and the corresponding driven gear to reach the same rotational speed before they are engaged. This allows the two corresponding sets of dogs to engage more quietly and smoothly, and prevents the dogs from being forced to mesh together by the shift fork. Once their speeds are synchronized, the two sets of dogs can mesh smoothly.

Figure 2:
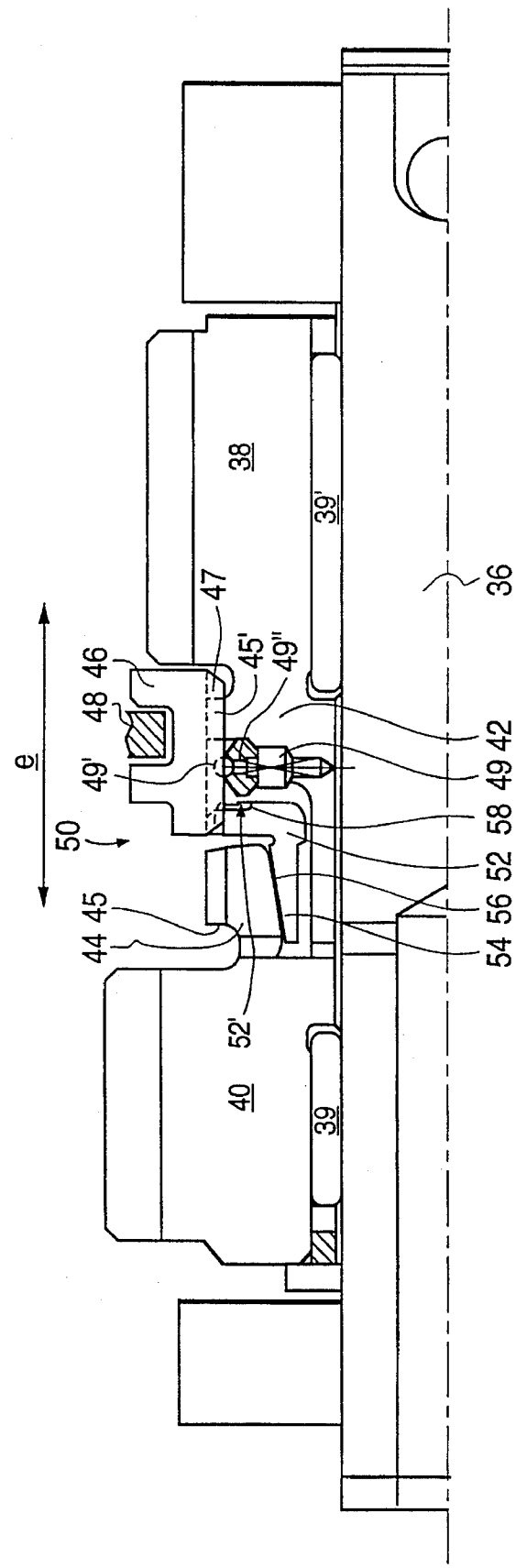
FIG. 2 is a schematic axial sectional view of the reverse gear synchronizer according to the preferred embodiment and illustrating a disengaged position of the reverse gears.
Figure 3:
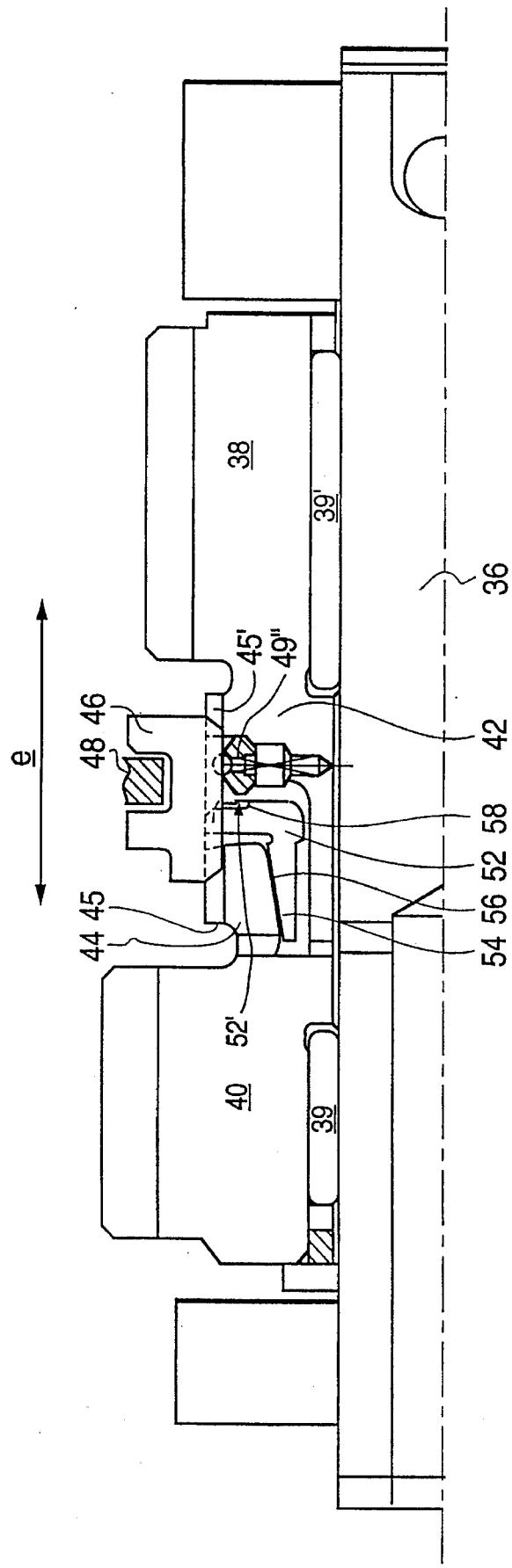
FIG. 3 is a schematic axial sectional view of the reverse gear synchronizer illustrating the engagement of the reverse gears.

Referring also to FIGS. 2 and 3, the transmission further has a reverse gear system constructed according to the invention. The reverse gear system comprises a reverse gear shaft 36. Axially fixed on reverse gear shaft 36 and mounted on needle bearings 39, 39' is a reverse idler gear 38 and a reverse driven gear 40 axially spaced from the reverse idler gear 38. Preferably, at least one of gears 38 and 40 is a helical gear. Reverse idler gear 38 is in constant meshing engagement with the driver gear 22 mounted on the counter shaft 14, and reverse driven gear 40 is in constant meshing engagement with teeth (not shown) located on the periphery of shift collar 28 mounted on the main shaft 12. When not engaged together, reverse idler gear 38 and reverse driven gear 40 are free to rotate independently of one another and of reverse gear shaft 36.

Reverse idler gear 38 and reverse driven gear 40 are each provided with axially aligned hubs 42, 44 that project towards one another. Further, each hub 42, 44 has an outer peripheral surface having radially arranged dogs 45, 45', respectively. A sleeve 46 having teeth 47 arranged about the inner circumference thereof is provided that is axially slidable along reverse gear shaft 36 by shift fork 48 in direction e to engage the dogs of hubs 42 and 44 together, so that reverse idler as a single gear. Preferably, teeth 47 of sleeve 46 are in constant engagement with the dogs of one of the reverse gears, in this example reverse idler gear 38, so that the sleeve and the engaged one gear rotate concurrently at all times. When sleeve 46 locks reverse idler gear 38 and reverse driven gear 40 together, driver gear 22 rotates both reverse idler gear 38 and reverse driven gear 40 in direction f, which in turn rotates shift collar 28 and main shaft 12 in direction g. Sleeve 46 is maintained in its desired positions by the shift fork 48.

To prevent gear clash or grinding when sleeve 46 engages dogs 45 and 45' together, a reverse synchronizer 50 is provided on reverse gear shaft 36 to allow dogs 45, 45' to reach the same rotational speed before they are engaged. This allows sleeve 46 to engage the dogs more quietly and smoothly, and prevents the sleeve and the dogs from being forced to mesh together by the shift fork.

Reverse synchronizer 50 comprises a blocker (synchronizer) ring 52 located between reverse idler gear 38 and reverse driven gear 40 and having a coaxially arranged conical projection 54. One of the hubs, for example hub 44, is provided with a corresponding, coaxially arranged conical bore 56 for receiving projection 54 in a frictionally engaging manner. Blocker ring 52 further comprises teeth or splines 58 at an outer periphery thereof that are in constant meshing engagement with corresponding teeth 47 of sleeve 46.

The reverse synchronizer includes an indexing system 49 comprising three spring-loaded indent balls 49' (only one is visible in FIGS. 2 and 3) and a corresponding indentation (not shown) on the sleeve 46 and three inserts 49" (only one is visible in FIGS. 2 and 3). It is to be understood that any other suitable indexing system may be used. Thus, sleeve 46, blocker ring 52 and one hub and reverse gear, in this example hub 42, indexing system 49 and reverse idler gear 38, rotate concurrently and at the same rotational speed. FIG. 2 illustrates the fully disengaged state in which the teeth 47 of the sleeve 46 are out of engagement with dogs 45 of the hub 44.

When sleeve 46 is caused to be axially slid along reverse gear shaft 36 by shift fork 48 in a direction towards the disengaged reverse gear 40, the non-illustrated indentation of sleeve 46 pushes the spring-loaded indent balls 49'. The latter push the inserts 49" which, in turn, push synchronizer ring 52 at its surface 52' until projection 54 is pressed into frictional engagement with corresponding bore 56, causing the rotational speed of reverse driven gear 40 and reverse idler gear 38 to correspond. However, until these speeds do correspond, synchronizer ring 52 is in torsion due to the relative differences in the rotational speeds of the frictionally engaged reverse driven gear 40, and the meshingly engaged reverse idler gear 38. The torsion creates a transverse force between teeth 58 and teeth 47, preventing any further movement of sleeve 46 in a direction towards the meshingly disengaged reverse driven gear 40. Once the rotational speeds of the gears do correspond, i.e. are synchronized, any transverse forces occurring between teeth 58 and teeth 47 are reduced, allowing sleeve 46 to slide over the hub 44 to thus cause a synchronized engagement between teeth 47 of the sleeve 46 and dogs 45 of the hub 44. In this manner a synchronized torque-transmitting connection between reverse idler gear 38 and reverse driven gear 40 is achieved, as is illustrated in FIG. 3.

Preferably, reverse synchronizer 50 is located in oil reservoir 60 so that the synchronizer is constantly submerged in oil.

The foregoing is a complete description of a preferred embodiment of the invention. Various changes may be made without departing from the spirit and scope of the present invention. The invention, therefore, should be limited only as set forth in the claims.

What is claimed is:

1. A manual transmission for a motor vehicle, comprising:
   (a) an axially rotatable input shaft;
   (b) an axially rotatable counter shaft constantly torque-transmittingly coupled to said input shaft;
   (c) a plurality of driver gears constantly torque-transmittingly mounted on said counter shaft;
   (d) an axially rotatable main shaft;
   (e) a plurality of forward driven gears mounted on said main shaft for free rotation relative to said main shaft; said driven gears being in a constant meshing relationship with respective said driver gears and defining determined transmission ratios therewith;
   (f) forward gear selecting means for torque-transmittingly coupling a selected said forward driven gear to said main shaft for rotating said main shaft from said counter shaft at a selected transmission ratio;
   (g) a reverse shaft;
   (h) a reverse idler gear axially fixedly mounted on said reverse shaft;
   (i) first torque transmitting means for constantly torque-transmittingly coupling said reverse idler gear to said counter shaft;
   (j) a reverse driven gear axially fixedly mounted on said reverse shaft at an axial distance from said reverse idler gear;
   (k) second torque transmitting means for constantly torque-transmittingly coupling said reverse driven gear to said main shaft;
   (l) reverse gear selecting means for torque-transmittingly coupling said counter shaft to said main shaft by means of said reverse idler gear and said reverse driven gear; said reverse gear selecting means including a sleeve axially slidably mounted on said reverse shaft between said reverse idler gear and said reverse driven gear; said sleeve having first and second axially spaced positions;

(m) cooperating locking means provided on said sleeve, said reverse idler gear and said reverse driven gear for torque-transmittingly coupling said reverse idler gear to said reverse driven gear in said first position of said sleeve and for disengaging said reverse idler gear from said reverse driven gear in said second position of said sleeve; and (n) synchronizing means mounted on said reverse shaft between said reverse idler gear and said reverse driven gear for synchronizing rotational speeds of said reverse idler gear and said reverse driven gear prior to allowing said sleeve to assume said first position.

2. A manual transmission as defined in claim 1, wherein said sleeve is constantly torque-transmittingly connected to one of said reverse idler gear and reverse driven gear.

3. A manual transmission as defined in claim 1, wherein said forward gear selecting means includes a shift collar axially slidably mounted on said main shaft and being in constant torque-transmitting connection with said main shaft and with said reverse driven gear; said shift collar constituting said second torque transmitting means.

4. A manual transmission as defined in claim 1, wherein one of said driver gears is in constant torque-transmitting connection with said reverse idler gear; said one driver gear constituting said first torque transmitting means.

5. A manual transmission as defined in claim 1, further comprising an oil reservoir; said synchronizing means being submerged in said oil reservoir.

6. A manual transmission as defined in claim 1, wherein at least one of said reverse driven gear and said reverse idler gear is a helical gear.

* * * * *